(12) United States Patent
Shagrithaya et al.

(10) Patent No.: US 9,110,999 B2
(45) Date of Patent: Aug. 18, 2015

(54) VIRTUAL DATA SHARING USER APPLICATION

(71) Applicants: Thana Shagrithaya, Dallas, TX (US); Bala Shagrithaya, Dallas, TN (US)

(72) Inventors: Thana Shagrithaya, Dallas, TX (US); Bala Shagrithaya, Dallas, TN (US)

(*) Notice: Subject to any disclaimer, the term of this patent is extended or adjusted under 35 U.S.C. 154(b) by 0 days.

(21) Appl. No.: 13/670,837

(22) Filed: Nov. 7, 2012

(65) Prior Publication Data

US 2013/0117328 A1 May 9, 2013

Related U.S. Application Data

(60) Provisional application No. 61/557,094, filed on Nov. 8, 2011, provisional application No. 61/721,733, filed on Nov. 2, 2012.

(51) Int. Cl.
*G06F 17/30* (2006.01)
(52) U.S. Cl.
CPC ................ *G06F 17/30867* (2013.01)

(58) Field of Classification Search
CPC ........ G11B 27/02; G11B 27/10; G11B 27/022
USPC ................... 707/803, 805; 345/810, 848, 757
See application file for complete search history.

(56) References Cited

U.S. PATENT DOCUMENTS

| 7,096,431 | B2* | 8/2006 | Tambata et al. ............... 715/834 |
| 7,350,158 | B2* | 3/2008 | Yamaguchi et al. .......... 715/834 |
| 7,853,879 | B2* | 12/2010 | Yoshikawa et al. ........... 715/716 |
| 2004/0155907 | A1* | 8/2004 | Yamaguchi et al. .......... 345/810 |
| 2009/0013241 | A1* | 1/2009 | Kaminaga ..................... 715/203 |
| 2010/0281378 | A1* | 11/2010 | Pendergast et al. ........... 715/723 |

* cited by examiner

*Primary Examiner* — Baoquoc N To

(57) ABSTRACT

Disclosed are an apparatus and method of retrieving a plurality of data memory containers from a database. One example method of operation may include displaying the plurality of data memory containers on a graphical user interface, receiving a selection of one or more of the data memory containers, and displaying a moving array of the plurality of data objects included in the selected one or more data memory containers. The objects may be images or other user defined data files that are distributed to a virtual house application.

20 Claims, 18 Drawing Sheets

200

210

300

350

| # | Category Name | System Attribute 1 | System Attribute 2 | For 3D Display |
|---|---|---|---|---|
| 1 | Personal | Can be renamed | Available for upload section | Yes/No |
| 2 | Professional | Can be renamed | Available for upload section | Yes/No |
| 3 | Snapshots | Cannot be renamed | Not Available - system assigned | Yes/No |
| 4 | Mobile Uploads | Cannot be renamed | Not Available - system assigned | Yes/No |
| 5 | Family | Can be renamed | Available for upload section | Yes/No |
| 6 | Travel/Vacation | Can be renamed | Available for upload section | Yes/No |
| 7 | Sports | Can be renamed | Available for upload section | Yes/No |
| 8 | Hobby | Can be renamed | Available for upload section | Yes/No |
| 9 | Art | Can be renamed | Available for upload section | Yes/No |

900
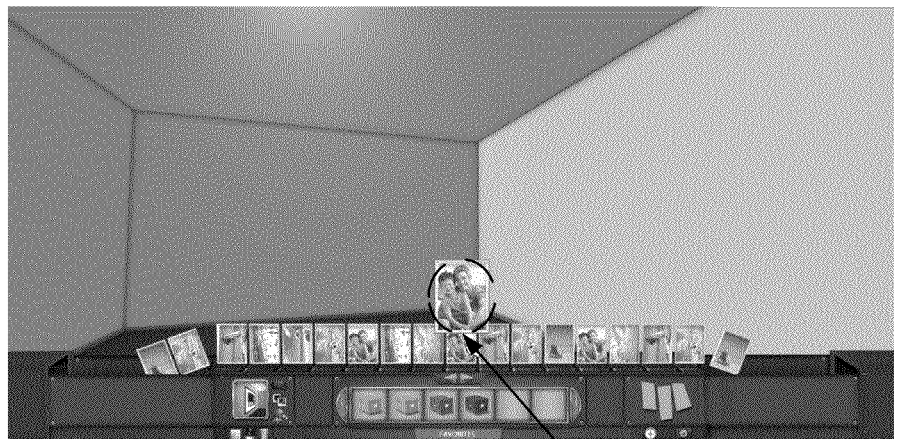
FIG. 9A    910
950
FIG. 9B    920

1000

1010

1100

1110    1112

1300
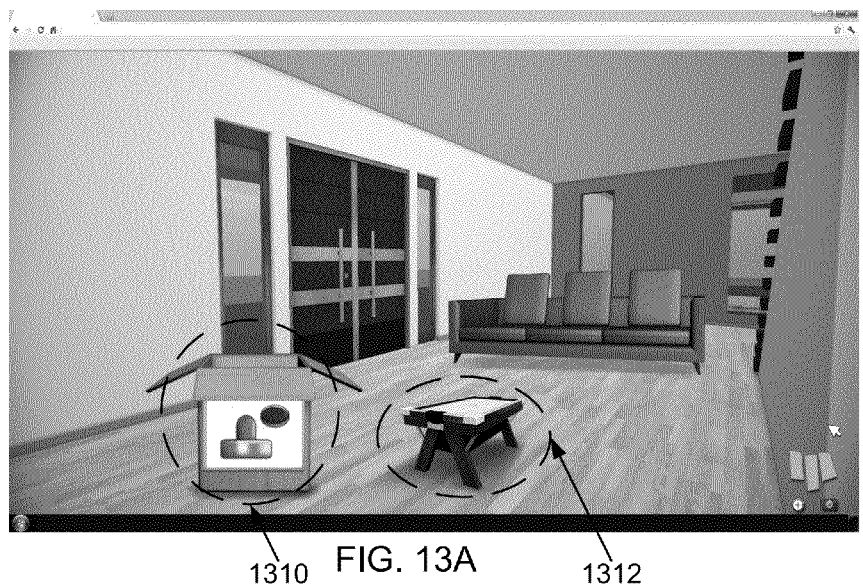
1310  FIG. 13A  1312
1350
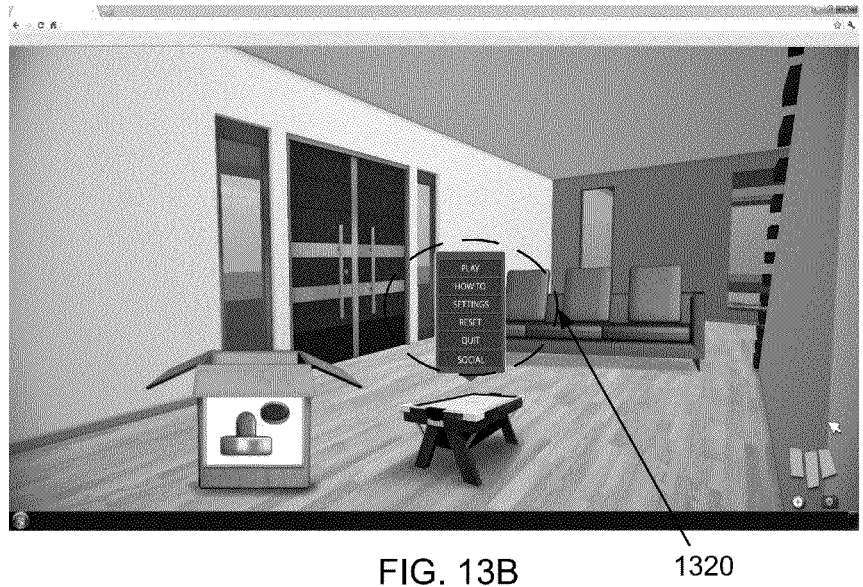
FIG. 13B  1320

1400

1410

VIRTUAL DATA SHARING USER APPLICATION

CROSS-REFERENCE TO RELATED APPLICATIONS

This application claims the benefit and priority of provisional application 61/557,094, entitled "EGOWALL", filed on Nov. 8, 2011, as well as provisional application 61/721,733 entitled "EGOWALL", filed on Nov. 2, 2012 the entire contents of each of which are hereby incorporated by reference.

TECHNICAL FIELD

This disclosure relates to a method and apparatus of receiving, storing and sharing user data via an online user application.

BACKGROUND

Within the realm of online websites and applications, GOGGLE® changed the way people learn and access information and FACEBOOK® and TWITTER® changed the way people communicate. Presently, there are more than 350 known social networking websites defining who people are and how they live and exchange information. However, most social networking websites are designed with an emphasis on the present time and as each day passes, the prior day is almost immaterial and non-existent. Past events are lost between blogging and micro-blogging.

People who use these websites have thousands of photos, records and other data files stored on computer hard drives with little or no organization. A user's gigabytes of personal data are seldom accessed because there is no simple and easy way to display them or offer them as available to a user of a computing device. As a result, past records and data are not shared or accessed as often because of the level of effort required by a user to locate and sort through all these stored gigabytes of files, data, folders, etc. People just don't have the time or patience to retrieve old computer documents and files which may be useful, sentimental or important to themselves or those they know.

SUMMARY

One embodiment of the present application may include a method of retrieving a plurality of data memory containers from a database, displaying the plurality of data memory containers on a graphical user interface, receiving a selection of one or more of the data memory containers, and displaying a moving array of the plurality of data objects included in the selected one or more data memory containers.

Another example embodiment of the present application may include an apparatus that includes a processor configured to retrieve a plurality of data memory containers from a database, display the plurality of data memory containers on a graphical user interface, and a receiver configured to receive a selection of one or more of the data memory containers. The apparatus may also include a display configured to display a moving array of the plurality of data objects included in the selected one or more data memory containers.

BRIEF DESCRIPTION OF THE DRAWINGS

FIG. 3B illustrates an example table of available categories according to example embodiments.

FIG. 9A illustrates an example object display and interaction user interface according to example embodiments.

FIG. 9B illustrates an example object selection interaction and selection action according to example embodiments.

FIG. 13A illustrates an example game play setup mode of operation according to example embodiments.

FIG. 13B illustrates an example game play universal menu mode of operation according to example embodiments.

DETAILED DESCRIPTION

Figure 1:
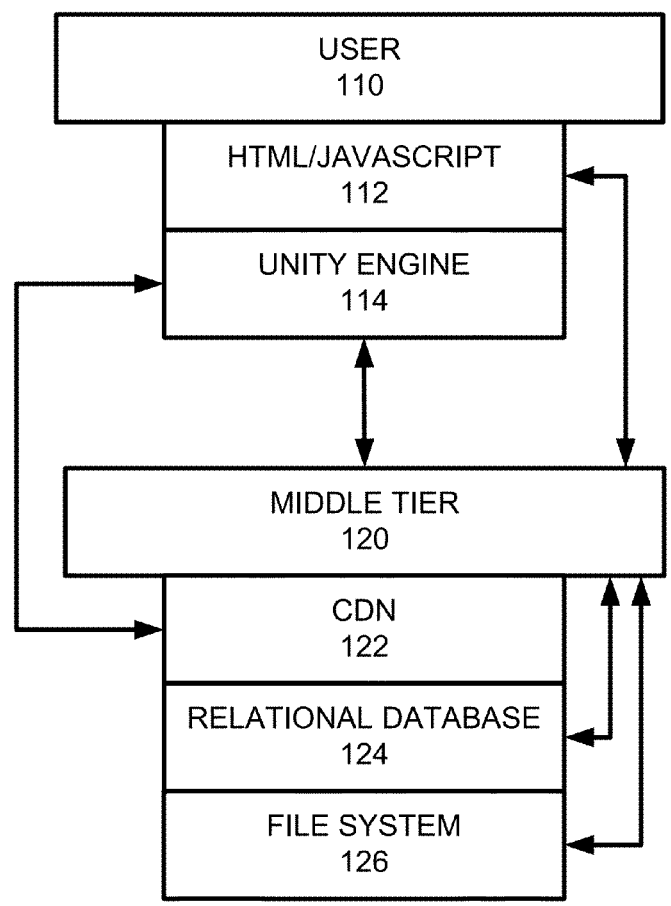
FIG. 1 illustrates an example application architecture according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments of the present application, a server may be a local or a remote computer, a server computer device and/or a similar computing device. A client may be any computer, machine or related computing device that is connected directly to the server or over a remote network connection to the server. The client or client device may be a computer, laptop, mobile, wireless or cellular phone, a PDA, a tablet, a client, a server or any device that contains a processor and/or memory, whether that processor or memory performs a function related to an embodiment of the application.

According to example embodiments, a web-based gaming and/or social networking application is provided that includes a portal or website that permits online users to import, organize and/or share their lifetime achievements and memorabilia (i.e., personal 'objects' or 'keepsakes'). The site's interactive real-life user experience is enabled via a game engine integrated within a social networking platform. For example, users may be offered efficient storage and/or access to their digitized 'objects.' The example embodiments also provide application(s) that demonstrate and share users 'objects' via a user-controlled and/or interactive three-dimensional (3D) space. The application(s) may be provided to end users operating client machines via a web browser and/or a mobile application interface, and may be accessible on a personal computer, smart phone, tablet, or any other electronic devices with a display.

Examples of game-engine integrated social networking platforms provide users as people having virtual real life objects (i.e., 'objects' or 'keepsakes') such as, personal achievements and memorabilia, thus creating a record of personal identity and self-importance. Examples of such 'objects' may include college degree(s), certifications, sports trophies, personal or professional skills, children achievements, involvement in social and charitable activities, ethnicity, etc.

Using a web browser or other browser access application, the objects defined by the user or by the application may be stored in large quantities in a remote server or online memory site (i.e., the cloud), are organized into folders, or 'containers' similar to the shoeboxes used to store family mementos, vacation photos, etc. Once the photos are organized, tagged, named, and/or stored, they may be retrieved and brought into a virtual environment (e.g., user-created homes) and delivered to the user via a unique organization and/or transport device. For example, the documents or objects may be accessed via a folder presentation system, such as a conveyor system. The users may view, identify and select an object(s) of interest from the containers and drag them to the walls of the living room, kitchen, media room, hallways, etc. of the virtual home for display.

The user-created virtual homes include certain privacy and/or protection characteristics similar to those that a home would have in real life. For example, the vestibule is considered less private than the master bedroom. Therefore, more private and personal objects would be kept/displayed on the walls of a bedroom than in a vestibule. However, the degree of how private/personal an object is as being located in a room may vary with each user. Therefore, users have the ability to define the privacy level of an individual room, an individual object, and their corresponding sharing options with other users.

According to one example, in real life, a user would not bring someone they just befriended in a grocery store to their private room (e.g., a bedroom) to show them an expensive work of art that is hanging on the wall, but probably would feel comfortable doing so in the kitchen or living room of their house. Similarly, users of the virtual house application and object sharing environment may invite people at various personal and professional levels into their homes. Depending on their intimacy level and the nature of the visit, the user selectively allows visitors to view and share their achievements and memorabilia depicted in their "Wall." This configuration permits users to get to know each other better, as they would in real life.

Further, the social networking occurs in a traditional, realistic and meaningful way that can easily be sustained and maintained. Users may use their virtual space, homes, etc., to contact their existing friends, family and colleagues who are members of the virtual home application and establish relationships by inviting other users into their virtual home space just like in real life and sharing memories and showcasing the "Real You." Users of the virtual home application can establish new friends based on similar interests and character qualities if the user opts to share this information with other members. Users can also create new professional networks and connections by allowing colleagues, other professionals and companies into their dedicated home space. Users may showcase their real achievements and memorabilia in this manner with corporations and professionals to create opportunities for themselves as well as for others.

According to one example, an office wall environment may include a user as a working professional who displays academic and professional achievements to the public by allowing certain illustrations and data objects to be displayed on their wall. After importing photographs and other digital representations of a user's life achievements (i.e., family vacations, art, diplomas, certifications, professional achievements), the user may organize and display these objects in the room of their choice in their virtual home.

FIG. 1 illustrates an example application architecture according to example embodiments of the present application. Referring to FIG. 1, the example architecture 100 includes a user or users 110 which represents the users of the application. Any one of the users may access the application site via the HTML-based browser and access the 3D environment via a game engine. The HTML/JavaScript layer 112 is the browser environment where users register and become an online user of the integrated portal. The users may also organize and upload their own 'objects' as well as any other standard features of a social networking site.

The unity engine 114 represents a module or engine that processes the 3D virtual environment which the user creates. The unity engine 114 provides the user with access to the 'objects' which were previously organized and uploaded into the cloud. These containers are accessed and incorporated into the virtual house via a transport device that provides efficient access to the objects. The middle tier 120 represents a system that processes the user/client requests and accesses its relevant data storage (i.e., CDN 122, relational database 124 (RDBMS) or file system 124).

Figure 2:
FIG. 2 illustrates an example user registration graphical user interface (GUI) according to example embodiments.

FIG. 2 illustrates an example user registration graphical user interface (GUI) according to example embodiments. Referring to FIG. 2, the online user may become a member of the site by registering at the user registration interface page 200. The user may enter personal information, such as user name, address, email address, password, date of birth, gender, profession, etc. The user may then submit their registration to the processing server which creates a user account and stores the record for user access. Once a user establishes a registered user account, the user may upload objects and other data to be stored in the cloud.

Figure 3A:
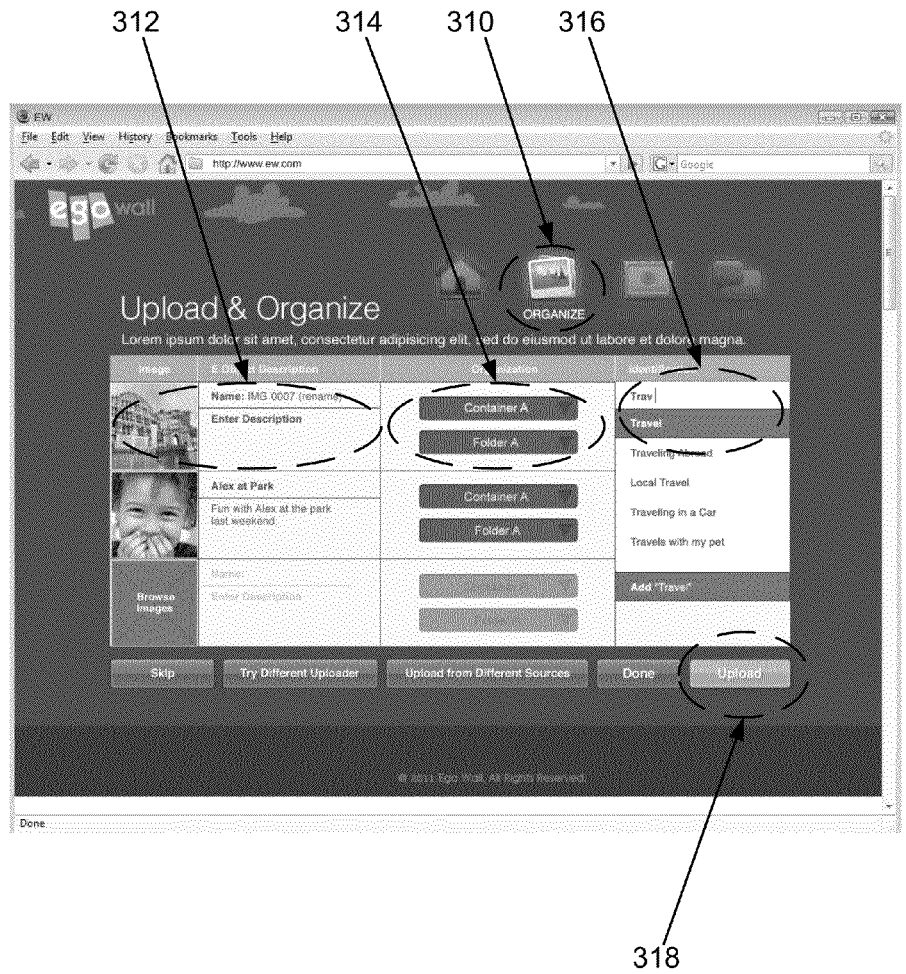
FIG. 3A illustrates an example organization and upload interface applied to objects in containers according to example embodiments.

FIG. 3A illustrates an example organization and upload interface applied to objects in containers according to example embodiments. Referring to FIG. 3A, upon successful registration the new customer is offered several steps of different activities. The first step may be to 'create' their environment or home by selecting the style of home and floor plan they desire. The user will then be provided with various images and video clips of available homes from which they may choose. Example home types or templates may include the following home styles including contemporary, colonial, retro and western.

Each home style has three floor plan variations for the user to select. The basic floor plan is free, and the second and third plans are available when purchased or earned by rewards. The user can upgrade from the basic floor plan at a later time. The upgrades are increments of space where additional rooms get added to the existing floor plan.

Another example operation may be to organize 310 the objects and user content. For example, the user may upload and organize their objects using containers. These containers are made available to the user in their environment to store objects and organize them by category or type. The user may begin by selecting an image 312 and naming the selection. The user may navigate to their image location on their computer hard drive or an external device and select an image to upload. The user may enter a name and the name field may have the image name from the computer. The user may enter a description to describe the image type or place, etc.

Next, a container selection may be performed by the user to organize the object or image into a particular container, which may have a plurality of folders in each container 314. The drop down list box (DDLB) lists all user-purchased and system-provided containers. The system initially provides each user with the following four containers upon registration, container A which belongs to the "Personal" category, container B which belongs to the "Professional" category, Snapshots which belongs to the "Snapshots" category and mobile uploads which belongs to the "Mobile Uploads" category.

The name of container A or B can be renamed by the user by selecting the text and entering the new name over old container name. The default container selection "Container A" is preselected by the system. The user can change the selection by picking any items from the container DDLB. Each container may have a maximum number of images (i.e., 30 images) allowed in each container. Each of the containers may be identified by a custom identification 316. The user may upload the images when the user is finished adding new images via the upload option 318. The respective category for the previously selected container appears on the category menu. The user can change the category by reassigning it via the management page. The following categories are available for the user to categorize and manage their data objects. FIG. 3B illustrates an example table 350 of the example categories and their corresponding attributes.

Other options may include the user adding tags to the images by entering them on the entry field or selecting from previously entered tags. Existing tags appears as the user enters the letters by a filtering process. The user repeats this process for each image. The user's upload and organization process should be both simple and interesting. Several options will be made available for mass uploads of files. A user can also upload their objects from other sources such as FACEBOOK® and PICASA® websites. After finishing the upload, the user may select "Done" and may be taken to the front of their currently created Home.

Figure 4:
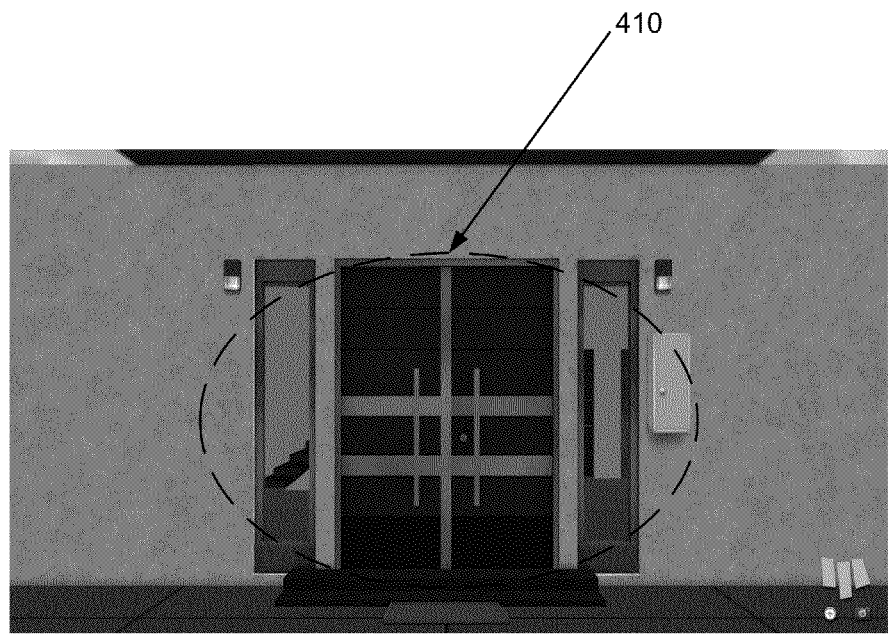
FIG. 4 illustrates an example front door user interface according to example embodiments.

FIG. 4 illustrates an example front door user interface according to example embodiments. Referring to FIG. 4, the front door 400 is an interface that allows certain add-ons and attributes specific to a user to be added by user or by object associations setup by the application. For example, a user may have certain affiliations, memberships or content preferences, and the front door area 410 may be auto-populated with add-ons indicative of such memberships. Upon creating their home environment and organizing and uploading their objects into the cloud, the user may be directed to the door step of their home. Users are also directly brought to the door step on all subsequent login efforts. This is the default setting unless the user specifies otherwise. However, the user can change the default setting (DS) to direct them to a particular home page instead.

Figure 5:
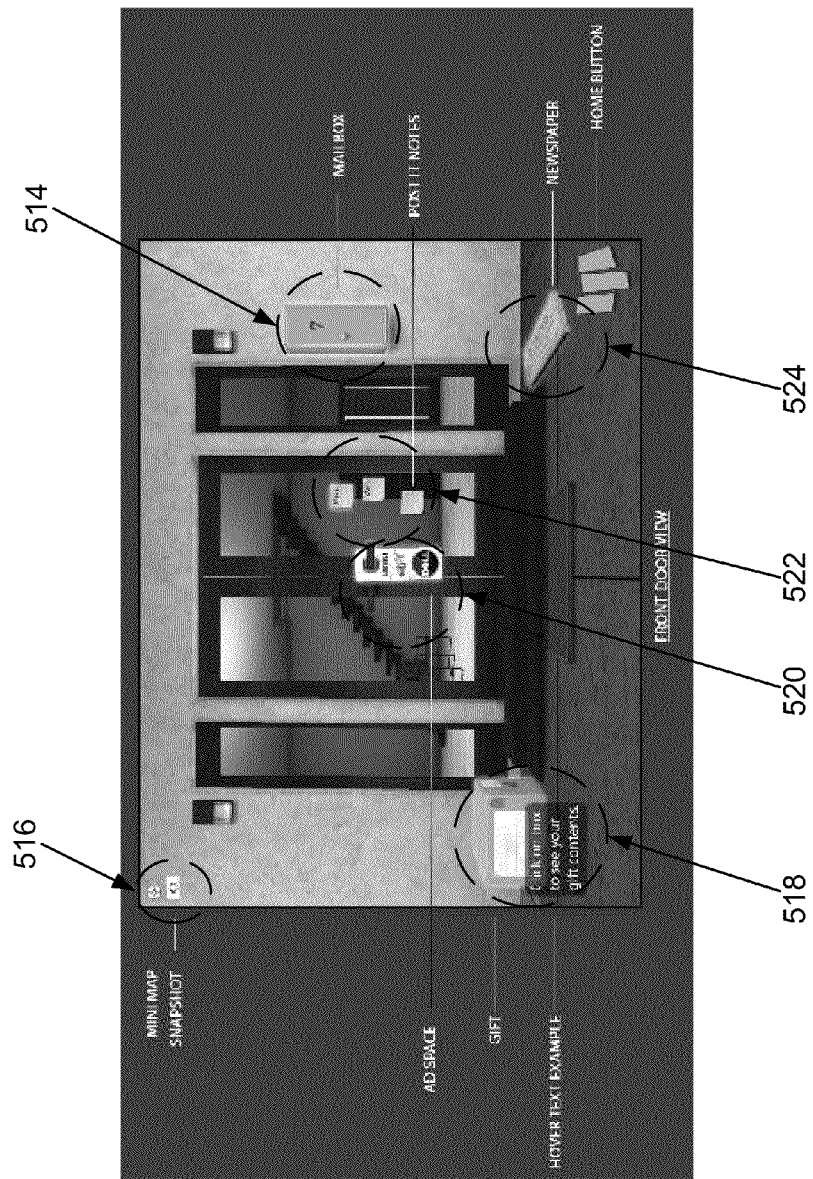
FIG. 5 illustrates an example front door user interface having user objects incorporated according to example embodiments.

FIG. 5 illustrates an example front door user interface having user objects incorporated according to example embodiments. Referring to FIG. 5, the front door 500 will be presented to the user with real life aspects, objects and elements integrated. For example, the user may have a particular affiliation designated as an object (i.e., membership to "ACME Investor Newspaper"). The user's affiliation may be mapped into a virtual object that is placed on the user's front door each day as the electronic version of the paper becomes accessible on a daily, weekly basis. For instance, the newspaper 524 may be a display object that is tied to a particular affiliation object designated by the user upon registration with the home application. As a result, if the user clicks on the newspaper 524, the prescribed newspaper(s) may be presented to the user without delay. The API of the home application may be accessible to various third party sites that deliver content to the subscribers as needed.

The user may enter their home environment by clicking on the door knob. Visitors can come to the door as long as they are members of the application. If the privacy setting permits, certain visitors may open the door and enter the first room generally referred to as the vestibule (i.e., foyer/lobby). The default setting is that all friends, family and colleagues can enter the first room. However, the user can change the settings by modifying the privacy and protection options.

Examples of components used in FIG. 5 may include a mailbox that may be used for a visitor to the home to drop-in private messages for the owner of the virtual home. The mail box illustrates the count of any new mail box messages for easy user access. The user may click on the mailbox 514 and enter a password or log-in via their credential to view their messages. A UPS®, FEDEX®, etc., courier service may deliver a virtual envelope or box 518 to the user and place it on the outside of the house so a user may then see that their recent package or envelope has been delivered to their real house or is at least in route and may be identified by the tracking numbers assigned to the user. The entire message interface is provided to the user and the virtual home owner via the wall message interface system (MIS). The MIS is made available via the click of the 3-logo icon or home button.

Other options may include sticky notes 522 that are placed by a visitor or user who visits and leaves a public message to the owner or visitor. Messages may also be private and may require authorization before they are enlarged for user access. Also, third party advertisers may place virtual door knob fliers 520 (i.e., "EBAY®")—where businesses can place their advertisements or may pay to have one advertisement placed per day on a particular target user's home.

A gift box 518 may be a home-delivered gift to the user from their friends, colleagues and family, inside the gift box, may be all sorts of virtual presents, such as online credit to AMAZON® or EBAY®, or an eBook, or streaming video, etc., or a link confirming a real address for a package to be sent, etc. Door Knob—Used to open the door to enter the home by the user and visitor. Access is granted only to the friends, family and colleagues.

The door mat may be customized and may be a decorative component as well as a functional component used to indicate the download completion rate of the 3D environment. As part of a basic setup of their home, the user may be provided with an aesthetically pleasing home style and appropriate door mat. Users may buy additional door mats and change their settings to show their desired door mat (College Team, funny messages, holiday season, etc.). The snapshot 516 is a camera mounted at the front of the door to take snapshots of the current view of the home or any important message left by the visitor. The snapshots are stored and automatically organized by the system in a system specific container called "snap shots 1" under the category snapshots. Once the container exceeds the maximum number of objects which it can accommodate, the system displays the message "snap shots container 1 is full" do you want to buy more or do you want to organize the present objects?" The snapshots may be pictures of visitors and other records which are desired to be received by the user.

Figure 6:
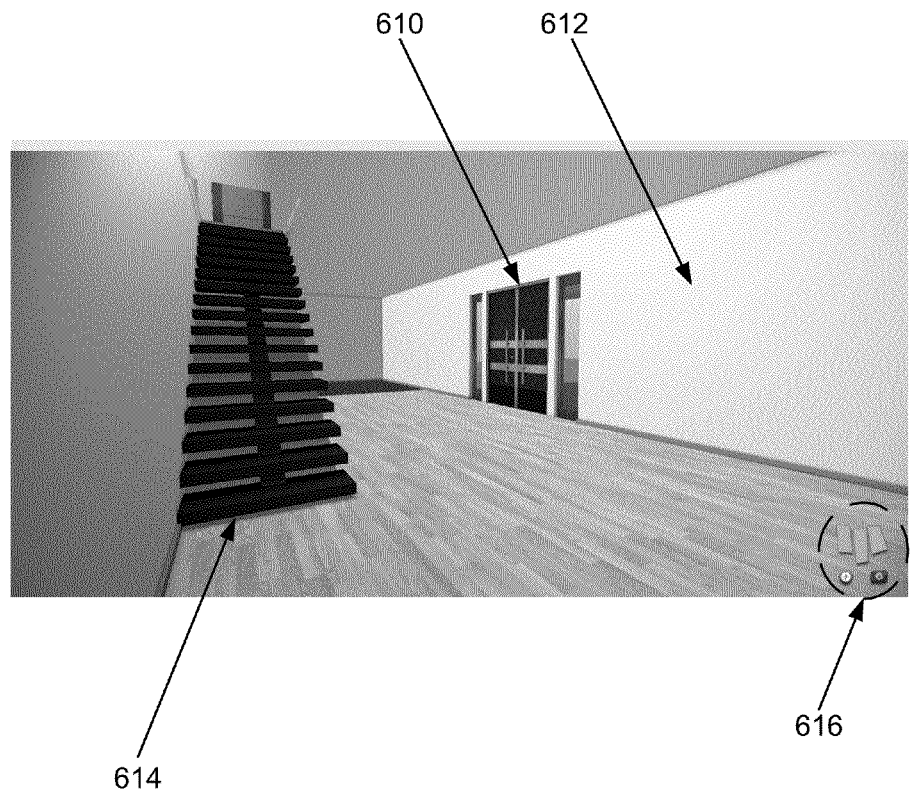
FIG. 6 illustrates an example empty home space user interface according to example embodiments.

FIG. 6 illustrates an example empty home space user interface according to example embodiments. Referring to FIG. 6, the empty home space 600 illustrates the initial foyer portion of the house as an empty space that is ready to be customized. For example, the front door 610 is illustrated as being closed and the wall 612 has not yet been populated with user objects. The stairs 614 may lead to the upstairs which a user may click on to exit the foyer at any time assuming the user has access to leave the foyer. The shortcut items include a home button (three panels), a snapshot icon and a compass icon. According to this example, the user is presently in their living home. The user can walk around and look around and can walk up the stairs and go room to room. The user may also select via the space bar at anytime to initiate the conveyor belt for decorating the room with their objects or furniture and decors. The mini map icon or compass is used to assist users and visitors in navigating the environment. A user can walk around the space or teleport to a specific location/room by selecting the location/room on the mini map.

Figure 7:
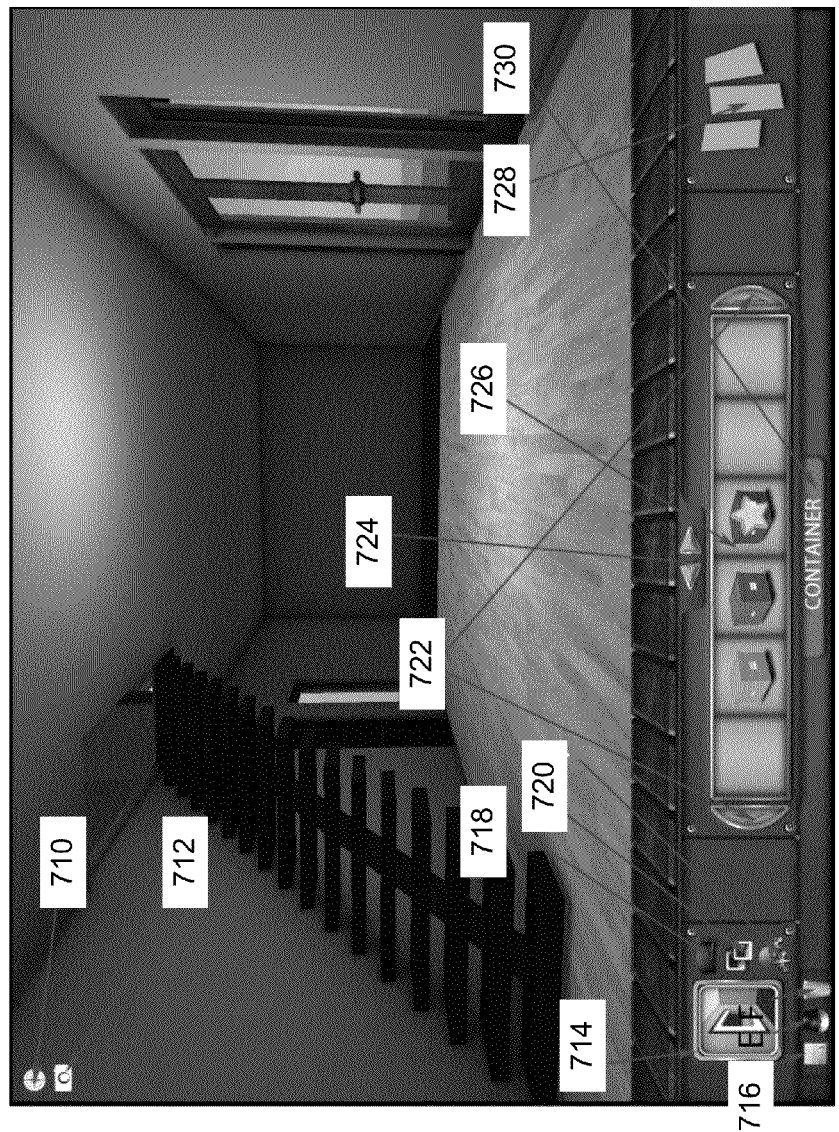
FIG. 7 illustrates an example virtual conveyor system user interface according to example embodiments.

FIG. 7 illustrates an example virtual conveyor system user interface according to example embodiments. Referring to FIG. 7, the wall conveyor system (WCS) 700 is a virtual transport device. The system application retrieves and delivers the user's objects, furniture games, etc., via this device. The device has three select modes display, furnish and games (indicated in FIG. 7 as 718 and 720). Other objects include a mini map 710, which provides a graphical representation of the home layout and floor plan. It is used to assist users and visitors in navigating the environment. The user can walk around the space or teleport to specific locations or rooms by selecting the location/room on the mini map.

Item 712 is a snapshot icon or camera mounted to take a snapshot of the current view of the home or any important message left by the visitor. The snapshots are stored and automatically organized by the system in system-specific containers. The current mode panel 714 illustrates one of three possible modes the conveyor belt can be operating in including furnish mode, display mode, or mini-game mode (options 718 and 720.

Item 716 provides a publish option for a user to select and use to publish the displayed/furnished homes. Another option may be a save icon to save the changes the player made to the map in this session. Or, a trash icon which can be used to trash the current changes made to the house, and which takes the player to the front door of the last build to start over. The furnish mode activates a furnish operation on the conveyor system (WCS). The WCS brings in user-purchased furniture or furniture that is received as gifts to decorate the home.

Item 720 provides a display mode which activates a display mode on the conveyor system (WCS). The WCS retrieves the user's containers from memory and places them on the dashboard for selection and to display objects. The other icon for 720 is a mini-game mode which activates a mini-game on the WCS and brings in user-purchased games to be setup and played by the user(s). Left and right arrows on the inventory bar 722 may be used to scroll the inventory bar to the right and left to view the contents of the container(s). Left and right arrows on the conveyor belt 724 may be used to scroll back and forth through the items in the current inventory slot.

One specific container of the inventory bar 726 may illustrates a unique container type or category of furniture/containers available for a user to select to populate the room. The home button 728 may retrieve the user selection menu. The containers category theme status 730 illustrates the current inventory theme or category.

Figure 8A:
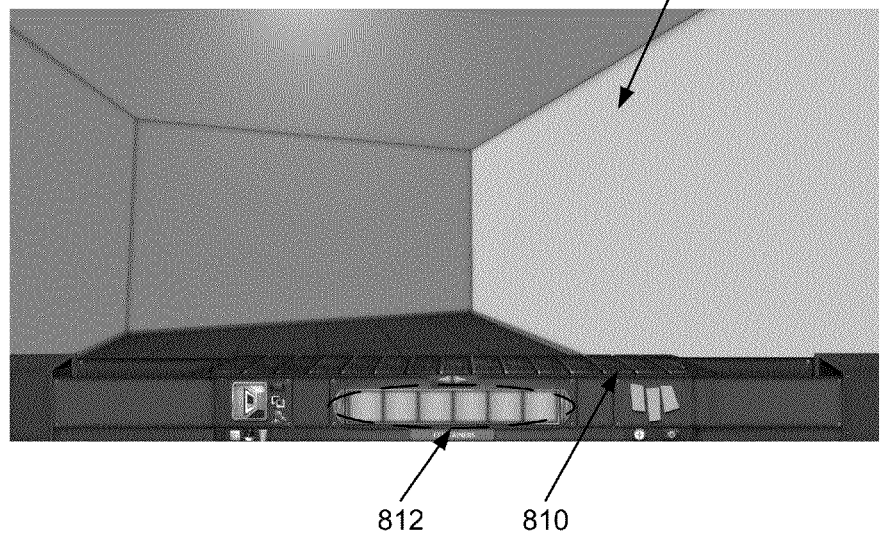
FIG. 8A illustrates an example virtual conveyor system prior to content/object population according to example embodiments.

FIG. 8A illustrates an example virtual conveyor system prior to content/object population according to example embodiments. Referring to FIG. 8A, the initial state of the WCS is illustrated just after it has been brought into a user's virtual home. There is no initial/default state for the WCS. The display panel 800 will illustrate the picture of the current home. The wall 814 will appear bare until the user populates it with objects. The inventory bar 812 and conveyor belt 810 will also appear empty until certain objects or containers are loaded. The belt may be moving from right to left at a moderate speed similar to an airport luggage carousel.

Figure 8B:
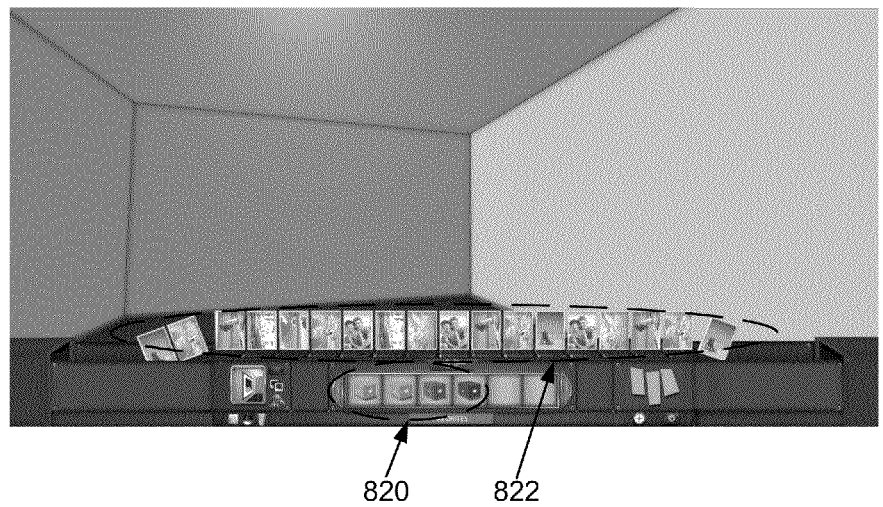
FIG. 8B illustrates an example virtual conveyor system with various content/objects populated according to example embodiments.

FIG. 8B illustrates an example virtual conveyor system with various content/objects populated according to example embodiments. Referring to FIG. 8B, the user may enact the following operations to begin operating the conveyor belt and populating objects and containers in the example room 850. For instance, the user may select a display icon(s). The selection of display icons may be displayed on the current mode panel. The WCS performs a transformation upon the display icon selection, such as displaying publish, save, trash icons, which appear at the bottom of the WCS. The inventory bar 820 illustrates all the containers belonging to the default category "Personal." The order may be displayed as "Latest uploads first. All remaining containers to follow within the Personal Category."

As a result, the conveyor belt 822 appears empty until the user selects a container. The container caption illustrates the default category contents "Personal", and in this case, the contents may include a variety of personal photographs. If the user selects a different category, a subsequent category may appear as text replacing the default category. As the user clicks on the container category, the subsequent category appears in the order listed in table 350 of FIG. 3B. As the user changes the category on the container category status bar, the container/inventory bar displays corresponding containers.

By performing a container mouse movement or 'mouseover', certain textual description of the container may be displayed. The textual description describes the container name, container added date, and container description number. The container selection by provides the user with certain options, such as 'open', which opens the selected container box (with animation/audio) and begins the conveyor belt (CB) movement. The EO may then begin moving down the CB. Once the first EO reaches the far end of the belt, the belt may stop moving. The state of the selected container may change its appearance and provide a different shade indicating that a particular container is in use.

Another option may be to 'skip', which dismisses the option menu, removes the focus from the current clicked container and does no further action. By selecting the container/inventory bar 820, and moving the arrow left to right moves the containers back and forth on the bar. This action allows users to navigate the entire set of containers within a category. An image selection performed by a user provides an increase in image view and resolution.

Selecting an image may provide a user with certain options, such as to edit the name, description, and/or tags linked to the image. The user may exit the information display by selecting "X" on the top corner. The user may also rotate an icon from left to right. The icon may also be scaled and expanded to zoom the images to the desired size. The trash icon may be used to delete the EO after confirming the intention to delete. The user may also exit the selected object and change the focus from the current clicked object.

FIG. 9A illustrates an example object display and interaction user interface according to example embodiments. Referring to FIG. 9A, the image conveyor 900 includes a container of images present on the conveyor and the user has just selected a single image or object 910 as a favored image for additional action. For example, the user may desire to share the image, place it on a wall, modify the image, etc.

FIG. 9B illustrates an example object selection interaction and selection action according to example embodiments. Referring to FIG. 9B, the example interface 950 illustrates the selected image 910 being modified by electing one or more rollover options 920 to modify, delete, crop, etc., the selected image. Certain options may include linking the image as a forerunner image to a virtual frame which may be placed on the wall of the virtual house and linked to particular set of images (i.e., Florida vacation family 2012). The image may be the firs of many images that may scroll like a slideshow to those viewing the images. Also, links to share the slideshow with other users may be established by selecting the image and customizing the image attributes and tags.

Figure 10:
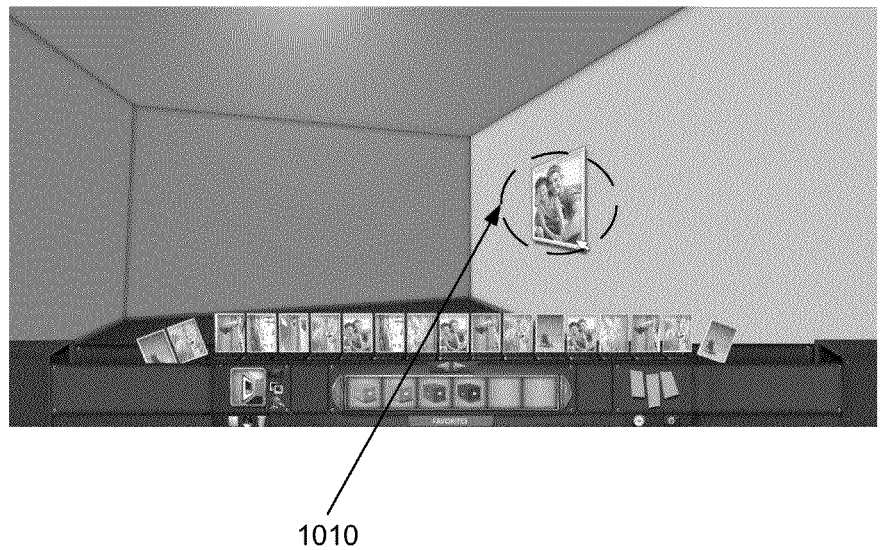
FIG. 10 illustrates an example wall display operation according to example embodiments.

FIG. 10 illustrates an example wall display operation according to example embodiments. Referring to FIG. 10, the wall 1000 has been populated with a selected image 1010. The image has been sized and placed in a particular position that is desirable to the user. In operation, the user selects an object of interest off the CB by clicking the image or object. Then the user clicks on the object that is set just above the CB to grab the object for purposes of placing it on the wall. At this point the WCS is removed and the user is free to move around the space to identify the place of interest to display the object. As the user approaches the wall and places the object at that point of interest. After placing the object at a certain location on the wall, the user can still change the location by clicking on the recently-placed object. At this point, the user may select the object 1010 and is now free to move again to find another place of interest.

The user may close the current container either by selecting the new container or by clicking the container on the container/inventory bar. This selection provides two options including to close all the objects from the conveyor belt with animation/sound and finally close the container or change the texture. The other option is to skip the option menu and perform no further action.

Figure 11:
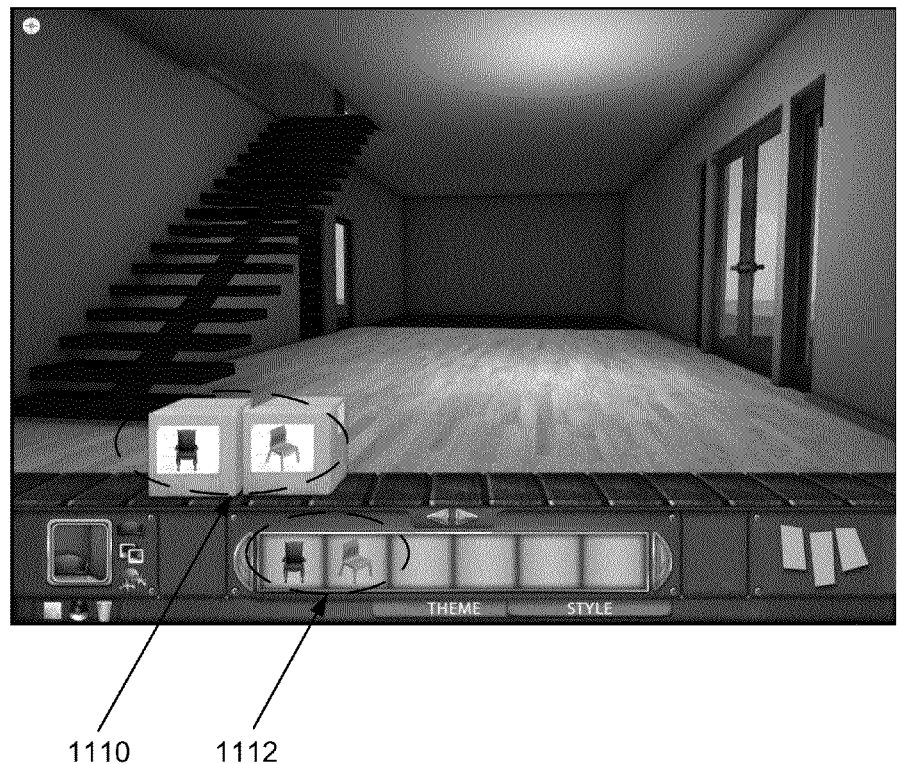
FIG. 11 illustrates an example home space decoration setup procedure according to example embodiments.

FIG. 11 illustrates an example home space decoration furnish mode setup procedure according to example embodiments. Referring to FIG. 11, the furnish mode of operation is described as the process of the user decorating their home with furniture. Available furniture may includes a sofa, chair, lamp, rug, photo frames, and animated objects, such as running water, etc. The user may begin by selecting to furnish icons. The selection of furnish icons is displayed on the current mode panel. The WCS performs certain transformations upon the display icon selection performed by a user.

The furniture selection example 1100 may include certain buttons including publish, save, and trash icons, which appear at the bottom of the WCS. The inventory bar illustrates all the furniture categories available, such as tables, seating, bedroom, living room, kid, workspace, outdoor, storage, décor, lights, electronics, miscellaneous, etc. The default furniture theme may be set to a theme that corresponds to home style of the home that is in decoration mode. The conveyor belt appears empty until the user selects a furniture category (i.e., chairs) 1110. The furniture theme caption illustrates the default theme "current home style." The conveyor belt may then be populated with the identified theme 1112. A user may select a theme icon and a subsequent theme may appear as text replacing the default theme. As the user selects the theme icon, the subsequent themes roll down in a specified order.

As the user changes the category on the theme status bar, the inventory bar displays corresponding furniture categories. The furniture category rollover action may display a textual description of the category. The textual description describes the category Name, description and number identifier of the furniture. Category selection begins by a user selection which invokes the conveyor belt (CB) moving. The CB starts moving down the panel as a result of a user initiated operation. Furniture within the selected category begins moving down the CB. Once the first item of furniture reaches the far end of the belt, the belt stops moving. The state of the selected container changes its appearance and a different shade indicates that a particular category has been selected or is in use. The order of the furniture is the most recent bought first within the selected category. A rollover operation may cause the furniture image from the box panel to slightly expand and come forward for a better view of the image without loading the much higher resolution image (256×256) and display a textual name of the virtual furniture.

The virtual furniture may be selected from the CB by the user. At this point, the WCS drops away and the user is free to navigate around the space to identify a place of interest. Once the desired location in the room is identified, the user places the furniture via a left mouse click. At this moment, the WCS is brought back into the scene to allow the furniture placement process to be repeated. An information icon may be presented to offer detailed information about the virtual furniture, including whether it was a gift, the date added to the inventory, notes, name, price, theme, etc. The user may exit the information display by selecting "X" on the top corner of the user interface.

Figure 12A:
FIG. 12A illustrates an example mini-game mode of operation according to example embodiments.

FIG. 12A illustrates an example mini-game mode of operation according to example embodiments. Referring to FIG. 12A, the games or 'mini-games' 1212 may be a list of icons that are brought onto the CB for the user to select and play in the virtual home that was created. These games are for all demographics and interests, ranging from 4-year-old children to adults. The mini-games can be purchased by visiting the a virtual shopping mall or can be gifted by a friend/family. These user-purchased or gifted mini-games are brought to the user in their home via the WCS. The user interface 1200 includes the CB 1210 which provides the games as they are selected from the containers 1212.

Examples of available mini-games include air hockey, blocks, racing cars, puzzles, etc. The user can take their mini-games off the CB 1210 and place it anywhere in their home and enjoy the game. When finished, the user can elect to return the game back to the WCS or leave it in their home space. The user may operate the mini-game selection by selecting game icons and displaying them on the current mode panel (C). The WCS performs a transformation upon a game icon selection including buttons, such as publish, save, and trash which appear at the bottom of the WCS.

The inventory bar 1212 illustrates all the game categories for the default game theme (e.g., educational, kids, fun, adult). By selecting a theme icon a subsequent theme will appear as text replacing the default theme. As the user selects the theme icon, the subsequent game options appear in a default order. As the user changes the theme on the theme status bar, the inventory bar displays the corresponding game categories. The game category rollover action may display a textual description of the category which includes the category name, description and number of games available in within that game category.

Figure 12B:
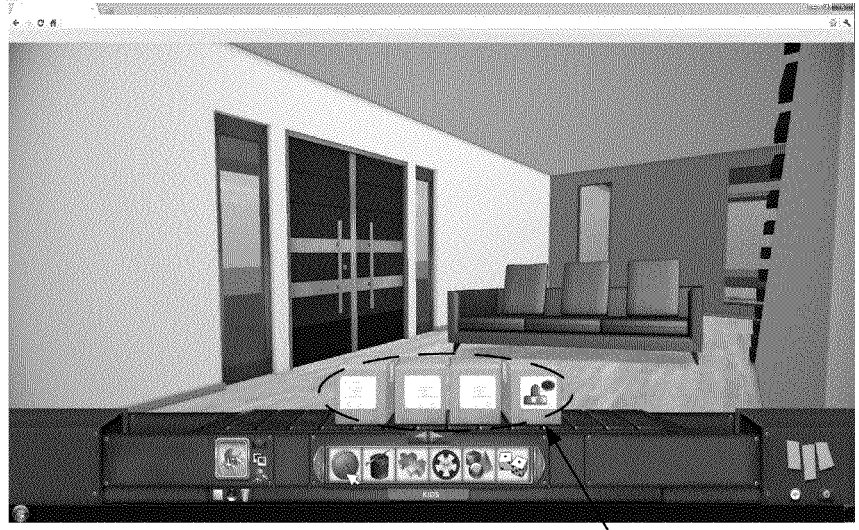
FIG. 12B illustrates an example game selection mode of operation according to example embodiments.

FIG. 12B illustrates an example game selection mode of operation according to example embodiments. Referring to FIG. 12B, in operation, the system starts the conveyor belt (CB) 1212. The CB starts rolling moving down the panel. Games within the selected category start moving down the CB boxed in storage boxes 1220. Once the first game box reaches the far end of the belt, the belt stops moving. The state of the selected game changes its appearance, with a different shade indicating that particular category has been selected or is in use.

By selecting the 'Grab' option, the user grabs the game box. At this point, the WCS drops away and the user is free to navigate around the space to identify the place of interest. The User next navigates around the space using the right mouse click with the game Box. Once the desired location is identified, the user places the game box by a left mouse click. At this moment, the WCS is brought back into the scene for repeating the game selection and placement process. The icon for information provides detailed information about the game in an information screen. The information includes whether the game was gifted or whether the game was purchased, the game name visible to all users, the game category, etc. An 'open' icon allows the box with audio and animation to being the game out to the space just above the box. The user now has the ability to work with the game. Once the user finds the place of interest to place the game, the user can place the game by a left mouse click and the system will place the game at that spot.

FIG. 13A illustrates an example game play setup mode of operation according to example embodiments. Referring to FIG. 13A, the user interface 1300 provides a game box that was previously selected. The game type appears on the box 1310 and the game 1312 appears next to the box. The user may return the item and send it back to the CB. The following message may appear "Are you sure you want to return back to the belt?" If the user selected "Yes," the game box with game is returned back to the WCS (with audio and animation) and the WCS is brought back to the scene with the game box placed back. Also, once the game is opened and the game is out on the game space an information icon may be selected to provide detailed information of the game in an information screen. The information includes whether the game was gifted or purchased.

Figure 14:
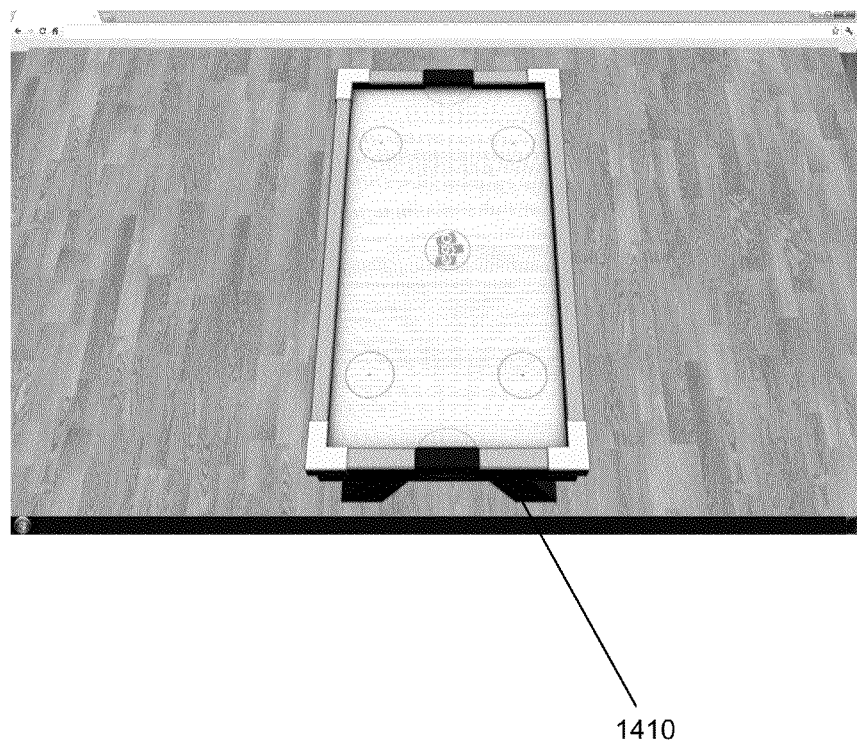
FIG. 14 illustrates an example game play mode of operation according to example embodiments.

FIG. 13B illustrates an example game play universal menu mode 1350 of operation according to example embodiments. Referring to FIG. 13B, the figure illustrates that the mini-game air hockey is placed in the virtual home. The user begin game play by performing a left mouse click on the game. The left mouse click provides a universal game menu 1320 panel with the following options based on the type and complexity of the game in play. For example, the user may start the game play of the selected game. FIG. 14 illustrates a different camera angle 1400 which moves into position to give the appropriate view of the game and navigation options 1410.

Once the user is finished, the user can return the game back to the CB. Selecting this Icon re-boxes the game and returns it to the CB. If the box has already been returned to the CB, the WCS is brought back with the empty box and the game is put back into the box on the belt itself. Or, the box is still in the home game space. In this case, the scene is changed to the location of the empty box and the game is put back into the box on that location and then returned to the CB.

Figure 15:
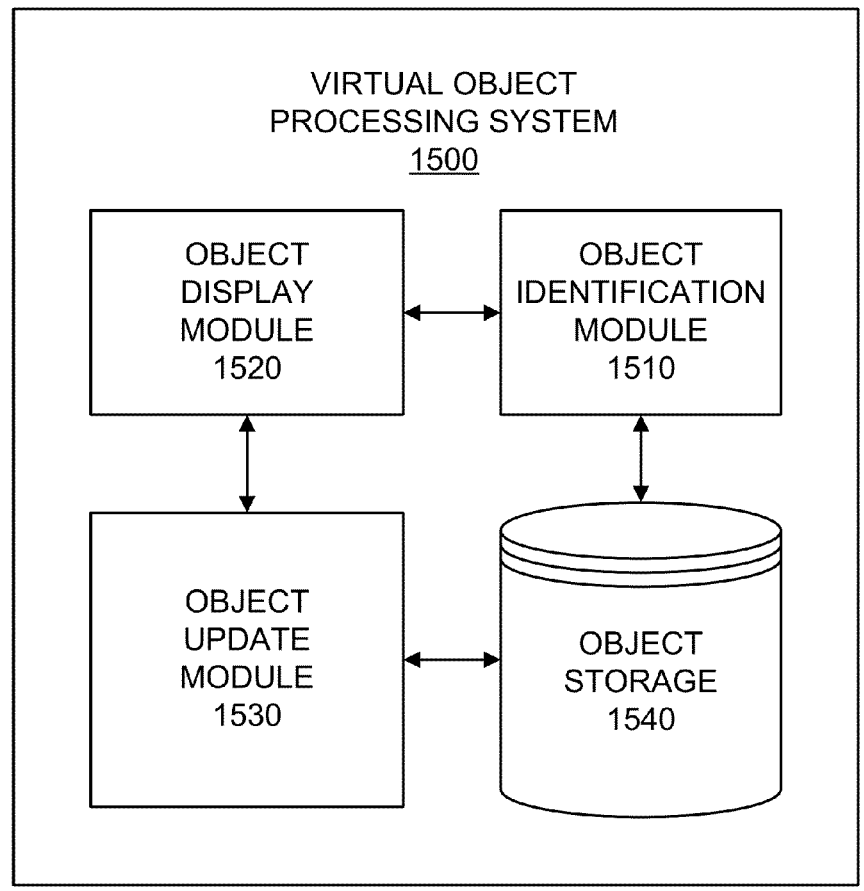
FIG. 15 illustrates a virtual object processing system according to example embodiments.

FIG. 15 illustrates a virtual object processing system 1500 according to example embodiments. Referring to FIG. 15, an object identification module 1510 may retrieve a plurality of data memory containers from an object storage database 1540. The object display module 1520 may be used to display the plurality of data memory containers on a graphical user interface of a user computer display device. The system 1500 may receive a selection of one or more of the data memory containers and the display module 1520 may display a moving array of the plurality of data objects included in the selected data memory container.

Each of the plurality of data memory containers may include a plurality of user defined objects. The user defined objects may be image files, audio files, video files, certifications, affiliations, virtual furniture and virtual games. A user defined object selection may be received and stored in memory via the object update module 1530. The user selection may be enlarged for editing purposes. The user selection may be displayed along with a plurality of object modification user options. The user may provide at least one object modification selection which is used to modify the object. The changes may be stored in memory. The user modified object may be displayed on a predefined display area, such as a wall of the virtual house. Changes to the object may include, cropping the object, enlarging the object, linking the object to group of other objects. The moving array of the plurality of data objects may include a plurality of closed virtual boxes that must be opened in order to access the object and modify the object. The boxes may remain closed until an authorization is received that the user may access the contents of the box (e.g., payment received, authorization received, etc.).

Figure 16:
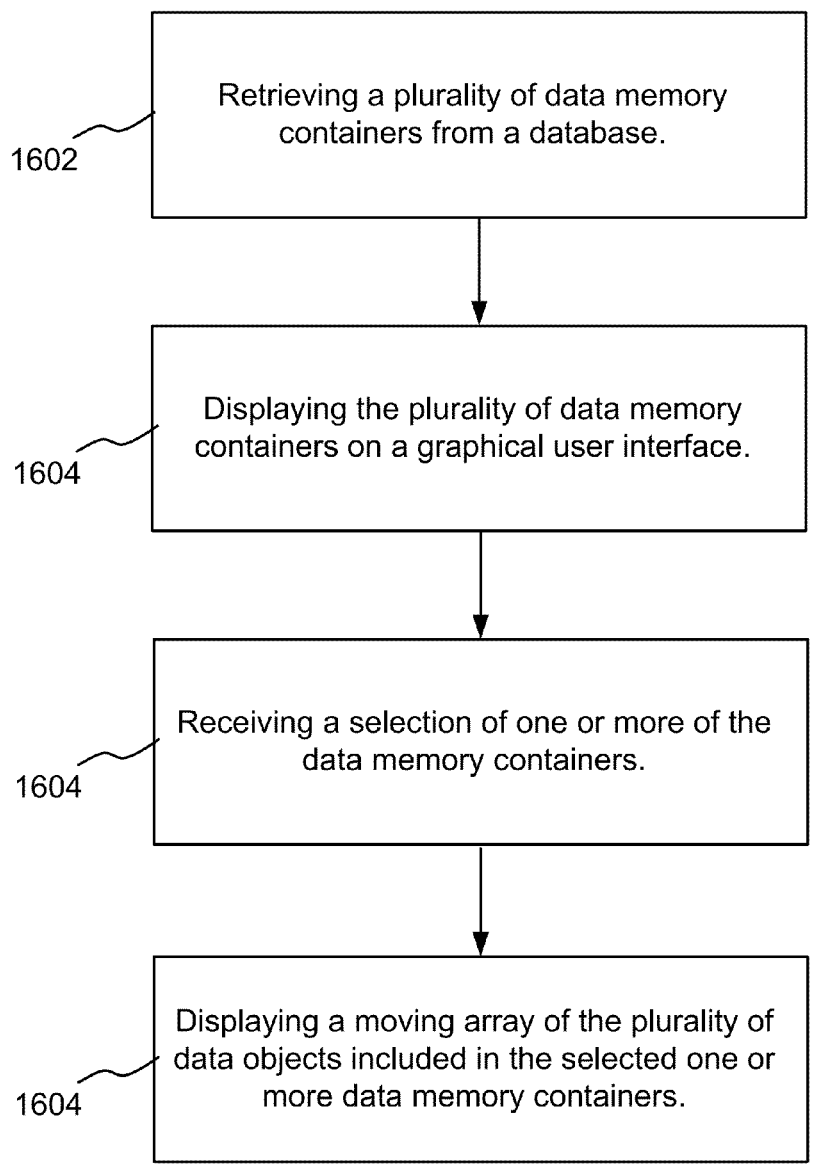
FIG. 16 illustrates a flow diagram of an example method according to an example embodiment of the present application.

FIG. 16 illustrates a flow diagram of an example method according to an example embodiment of the present application. Referring to FIG. 16, the flow diagram 1600 includes retrieving a plurality of data memory containers from a database at operation 1602 and displaying the plurality of data memory containers on a graphical user interface at operation 1604. The method may also include receiving a selection of one or more of the data memory containers at operation 1606, and displaying a moving array of the plurality of data objects included in the selected one or more data memory containers at operation 1608.

The operations of a method or algorithm described in connection with the embodiments disclosed herein may be embodied directly in hardware, in a computer program executed by a processor, or in a combination of the two. A computer program may be embodied on a non-transitory computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 17 illustrates an example network element 1700, which may represent any of the above-described network components.

Figure 17:
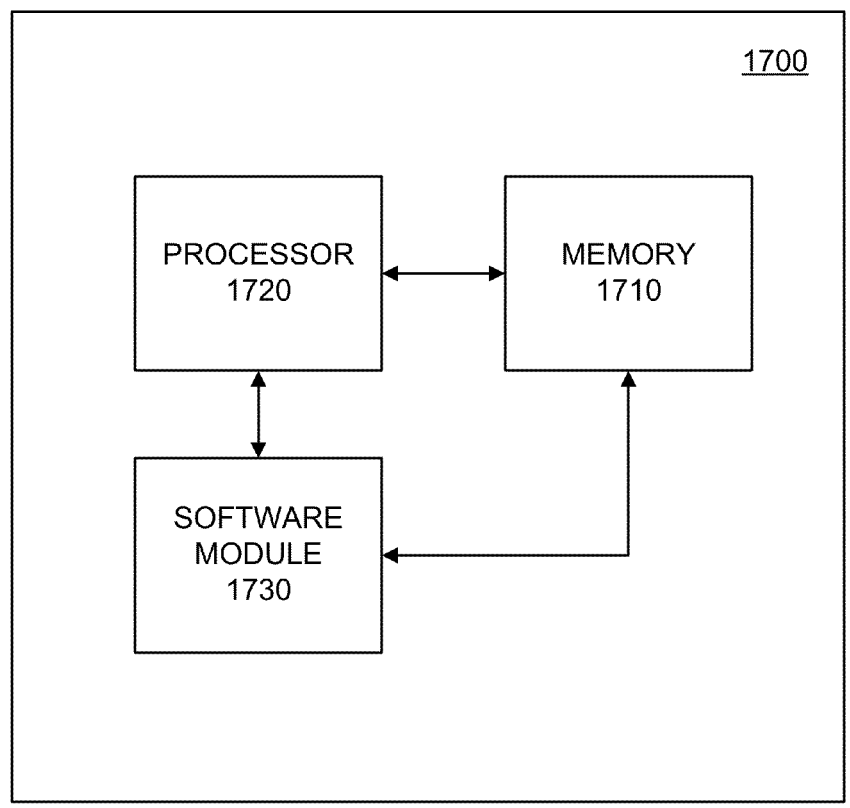
FIG. 17 illustrates an example network entity device configured to store instructions, software, and corresponding hardware for executing the same, according to example embodiments of the present application.

As illustrated in FIG. 17, a memory 1710 and a processor 1720 may be discrete components of the network entity 1700 that are used to execute an application or set of operations. The application may be coded in software in a computer language understood by the processor 1720, and stored in a computer readable medium, such as, the memory 1710. The computer readable medium may be a non-transitory computer readable medium that includes tangible hardware components in addition to software stored in memory. Furthermore, a software module 1730 may be another discrete entity that is part of the network entity 1700, and which contains software instructions that may be executed by the processor 1720. In addition to the above noted components of the network entity 1700, the network entity 1700 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems described can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    retrieving, via a processor, a plurality of data memory containers from a database;
    displaying, via the processor, the plurality of data memory containers on a graphical user interface;
    receiving, via the processor, a selection of one or more of the data memory containers;
    displaying, via the processor, on a conveyor system, a plurality of data objects included in the selected one or more data memory containers;
    furnishing, via the processor, using at least one of the plurality of data objects, at least one room via a mini map, which provides graphical representation of a floor plan including the at least one room; and
    taking, via the processor, a snapshot of a message left by a visitor to the at least one room, wherein the snapshot is stored and automatically organized on the conveyor system in the at least one of the plurality of data memory containers.

2. The method of claim 1, wherein each of the plurality of data memory containers comprise a plurality of user defined objects.

3. The method of claim 1, wherein the user defined objects comprise at least one of image files, audio files, video files, virtual furniture and virtual games.

4. The method of claim 1, further comprising:
    receiving, via the processor, at least one user defined object selection; and
    enlarging, via the processor, the selected at least one user defined object.

5. The method of claim 4, further comprising:
    displaying, via the processor, a plurality of object modification user options with the enlarged selected at least one user defined object;
    receiving, via the processor, at least one object modification selection;
    modifying, via the processor, the at least one object based on the received at least one object modification selection; and
    storing, via the processor, the modified at least one object.

6. The method of claim 1, further comprising:
    displaying, via the processor, the selected at least one user defined object on a predefined display area.

7. The method of claim 1, wherein a moving array of the plurality of data objects is displayed and comprises a plurality of closed virtual boxes.

8. An apparatus, comprising:
    a processor configured to
        retrieve a plurality of data memory containers from a database; and
        display the plurality of data memory containers on a graphical user interface;
    a receiver configured to receive a selection of one or more of the data memory containers; and
    a display configured to display, on a conveyor system, a plurality of data objects included in the selected one or more data memory containers;
    wherein the processor is further configured to:

furnish, using at least one of the plurality of data objects, at least one room via a mini map, which provides a graphical representation of a floor plan including the at least one room; and take a snapshot of a message left by a visitor to the at least one room, wherein the snapshot is stored and automatically organized on the conveyor system in the at least one of the plurality of data memory containers.

9. The apparatus of claim 8, wherein each of the plurality of data memory containers comprise a plurality of user defined objects.

10. The apparatus of claim 8, wherein the user defined objects comprise at least one of image files, audio files, video files, virtual furniture and virtual games.

11. The apparatus of claim 8, wherein the receiver is configured to receive at least one user defined object selection, and enlarge the selected at least one user defined object.

12. The apparatus of claim 11, wherein the display is further configured to display a plurality of object modification user options with the enlarged selected at least one user defined object, and the receiver is configured to receive at least one object modification selection, and the processor is configured to modify the at least one object based on the received at least one object modification selection, and store the modified at least one object.

13. The apparatus of claim 8, wherein the display is further configured to display the selected at least one user defined object on a predefined display area.

14. The apparatus of claim 8, wherein a moving array of the plurality of data objects is displayed and comprises a plurality of closed virtual boxes.

15. A non-transitory computer readable storage medium configured to store instructions that when executed cause a processor to perform:
retrieving a plurality of data memory containers from a database;
displaying, on a conveyor system, the plurality of data memory containers on a graphical user interface;
receiving a selection of one or more of the data memory containers;
displaying, on a conveyor system, a plurality of data objects included in the selected one or more data memory containers;
furnishing, using at least one of the plurality of data objects, at least one room via a mini map, which provides a graphical representation of a floor plan including the at least one room; and
taking a snapshot of a message left by a visitor to the at least one room, wherein the snapshot is stored and automatically organized on the conveyor system in the at least one of the plurality of data memory containers.

16. The non-transitory computer readable storage medium of claim 15, wherein each of the plurality of data memory containers comprise a plurality of user defined objects.

17. The non-transitory computer readable storage medium of claim 15, wherein the user defined objects comprise at least one of image files, audio files, video files, virtual furniture and virtual games.

18. The non-transitory computer readable storage medium of claim 15, wherein the processor is further configured to perform:
receiving at least one user defined object selection; and
enlarging the selected at least one user defined object.

19. The non-transitory computer readable storage medium of claim 18, wherein the processor is further configured to perform:
displaying a plurality of object modification user options with the enlarged selected at least one user defined object;
receiving at least one object modification selection;
modifying the at least one object based on the received at least one object modification selection; and
storing the modified at least one object.

20. The non-transitory computer readable storage medium of claim 15, wherein the processor is further configured to perform:
displaying the selected at least one user defined object on a predefined display area, and wherein a moving array of the plurality of data objects is displayed and comprises a plurality of closed virtual boxes.

* * * * *